(12) United States Patent
Auvray

(10) Patent No.: US 6,453,171 B1
(45) Date of Patent: Sep. 17, 2002

(54) DUAL-MODE TELEPHONE SYSTEM

(75) Inventor: Gérard Auvray, Bezons (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/275,438

(22) Filed: Mar. 24, 1999

(30) Foreign Application Priority Data

Mar. 30, 1998 (FR) .......................................... 98 03894

(51) Int. Cl.⁷ .................................................. H04Q 7/26
(52) U.S. Cl. ........................ 455/552; 455/426; 455/462
(58) Field of Search ................................ 455/552, 553, 455/435, 462, 465, 426, 572, 573

(56) References Cited

FOREIGN PATENT DOCUMENTS

| EP | 0 740 482 A1 | | 10/1996 |
|---|---|---|---|
| GB | 2 282 735 A | | 4/1995 |
| GB | 2284727 | * | 6/1995 |
| GB | 2 295 069 A | | 5/1996 |
| WO | WO 95/01070 | | 1/1995 |
| WO | WO 98/28929 | | 7/1998 |

* cited by examiner

*Primary Examiner*—Lee Nguyen
(74) *Attorney, Agent, or Firm*—Sughrue Mion, PLLC

(57) ABSTRACT

A dual-mode public and private telephone system is provided in which a switch-over switch makes it possible to go over from a mode in which a mobile telephone is used with public base stations to a mode in which it is used with a private base station. Provision is made such that putting the mobile telephone set on a stand of the private base station causes location transmission by the mobile telephone set to cease. As soon as the mobile telephone set is lifted off from its support, this causes an opposite command to be transmitted, whose effect is to cause the location transmission to be resumed.

12 Claims, 1 Drawing Sheet

DUAL-MODE TELEPHONE SYSTEM

The present invention relates to a dual-mode telephone system, i.e. a telephone system that can be used both with a public network and also with a private network. In such a system, the telephones used are mobile telephone sets. An object of the invention is to increase the reliability of the various components of the system.

BACKGROUND OF THE INVENTION

Public mobile telephone systems are known that comprise base stations distributed over an area of land and mobile telephone sets suitable for entering into communication with the base stations. The principle whereby they enter into communication is as follows: when a mobile telephone set is initialized, a message is transmitted for recognizing and identifying the mobile telephone set, and then the mobile telephone set cyclically transmits a location message to the base stations.

Since users of mobile telephone are mobile, it is necessary to keep track of them so as to be able to connect with them at all times. Tracking is achieved by the location signal being transmitted cyclically or continuously. The various base stations receive the location signal and, as a function of the signal level received by each of them, one of the base stations is designated as being the base station which should preferably be in communication with the mobile telephone set. As the user moves, the designation of the base station can change from place to place. The recognition and identification signals, the location signals, and the speech signals are transmitted from the mobile stations to the base stations and vice versa by means of radio transmission of phase and/or frequency modulated carriers. In the context of a public use, the frequency ranges of the modulated carriers are standardized: e.g. they are 900 MHz in GSM, and 1800 MHz in DCS. Other frequency ranges are available for other standards and protocols.

It has become apparent that it would be useful to transpose that type of system for private use. In practice, the same kind of base station equipment has been made available to private individuals, with operation being identical except that the frequency range is then confined to the frequency ranges available for use by private individuals (generally 27 MHz).

Other ways of using mobile telephones are known. In particular, in France, France Télécom used to distribute a "Phonepoint" type of mobile telephone known as "Bibop". That mobile telephone can also be used in dual (public and private) mode, and, at the beginning of a session, an identification message is transmitted. However, location messages are not cyclically transmitted. With that type of mobile telephone, the user must not move out from the proper reception range of the base station that recognizes the user at the beginning of a session. In practice, public use sessions are of limited duration, e.g. they are limited to four hours. Beyond that time, tracking is lost. The base station no longer knows the location of the mobile telephone set and no longer forwards incoming calls to it.

Because of the constraints constituted by limiting movement and by limiting session duration, that system is difficult to use.

Therefore, only one dual-mode system remains, namely the system first mentioned above.

The equipment implemented in such systems is of finite life-span. The more frequently the equipment is used, the shorter its life-span. In a dual-mode system, since the equipment is used continuously, it wears more rapidly.

OBJECTS AND SUMMARY OF THE INVENTION

An object of the invention is to increase the life-span of the equipment and to reduce its electricity consumption to as low as possible, and also reduce all radio transmission that occupies frequency space continuously.

In the invention, this object is achieved by making provision such that, in private-use operating mode, the location messages sent cyclically or continuously by the mobile telephone set to the private base station are no longer transmitted when the mobile telephone set is physically and electrically connected to the private base station, in particular when it is hooked thereon to cause its battery to be electrically recharged.

The invention thus provides a dual-mode telephone system comprising a private base station, base stations of a public network, and a mobile telephone, the mobile telephone being provided with a switch-over switch for going from an operating mode in which the private base station is used to an operating mode in which a public base station is used and vice versa, and including a circuit for transmitting a location signal to a base station, the private base station being provided with physical holding means and with electrical connection means respectively for physically holding and for electrically connecting the mobile telephone, said system including a detector for detecting that the private telephone is held on the private base station, and a control circuit for transmitting a command to cease transmission of said location signal, the mobile telephone including a slave circuit for modifying its operating mode as a function of this command.

BRIEF DESCRIPTION OF THE DRAWING

The invention will be better understood on reading the following description and on examining accompanying FIGS. 1 through 3 which is given merely by way of example and which in no way limits the invention.

MORE DETAILED DESCRIPTION

Figure 1:
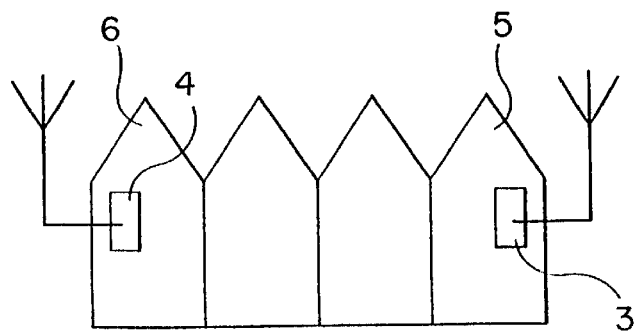
Figure 2:
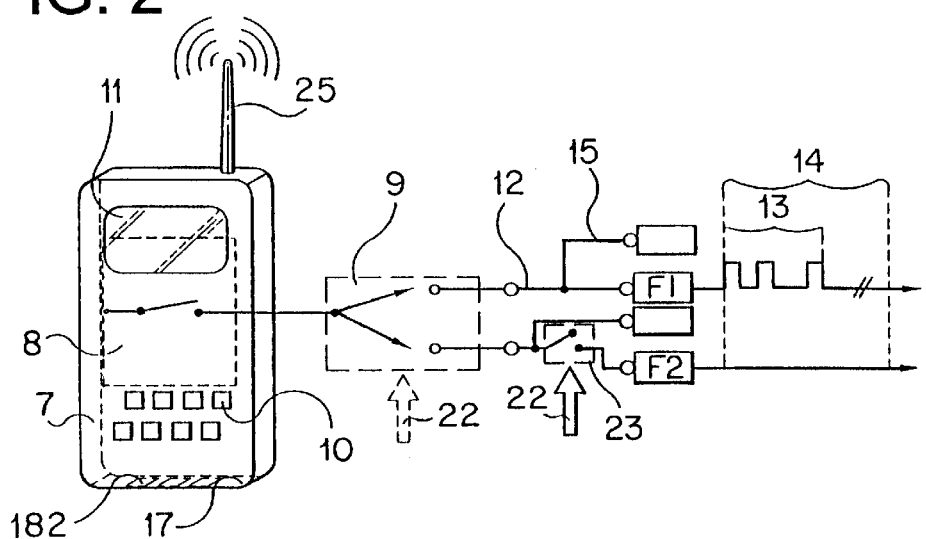
Figure 3:
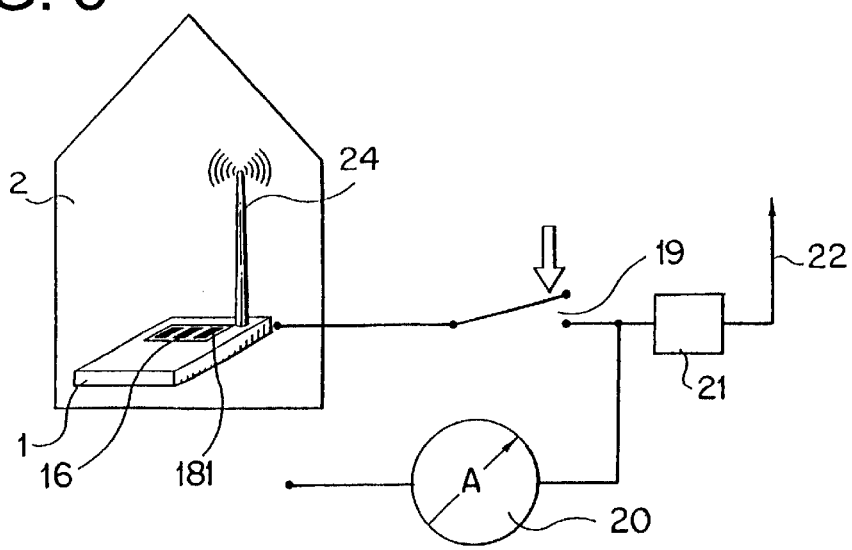

FIGS. 1 through 3 shows a dual-mode telephone system of the invention. This system includes a private base station 1. For example, the private base station 1 is disposed inside the home 2 of a private individual. The system also includes base stations 3 and 4 of a public network. For example, the base stations 3 and 4 are disposed on the fronts of houses 5 and 6 in front of which the bearer of a mobile telephone can move freely over a public area. The system also includes at least one mobile telephone 7. In conventional manner, the mobile telephone includes an initialization circuit 8.

In practice, this initialization function includes a protocol whereby the user must key in a secret code. The electrical initialization function can be likened to an electrical switch which switches electrical power from a battery of the mobile telephone set to the operating circuits of the mobile telephone set. In fact, the initialization is more complex. After it has been recognized that the user of the mobile telephone set 7 is indeed an authorized user, the mobile telephone set 7 sends an identification message to the base stations in the surrounding area. One of these stations, e.g. the one that receives the signal most strongly, is chosen. It assigns various constraints to the mobile telephone set 7: transmission level, frequency range, synchronization rate, and so on. In addition, this base station sends the identity of the mobile telephone set 7 to the central units of the network so that telephone calls can be routed to the mobile telephone set 7.

The mobile telephone set 7 may also include a switch-over switch 9 so as to go over from an operating mode in which a private base station 1 is used to an operating mode in which a public base station is used, i.e. in which the public network is used. Naturally, the identification stage takes place with the corresponding base station(s), depending on which mode is chosen.

The switch-over switch 9 is shown diagrammatically. It may comprise a physical switch-over switch. In general, it comprises a link to a microprocessor contained in the mobile telephone set 7 and whose private/public switch-over function is generated by the actions of an operator on keys 10 that are apparent on the front face of the mobile telephone set 7. In order to enable the various operations of initialization by means of the switch 8 and of switching over by means of the switch-over switch 9 to be performed successfully, the mobile telephone set generally includes a screen 11 on which various items of information, in particular relating to operation of the mobile telephone set 7 are displayed, generally in non-encrypted manner.

In the state of the art, the same type of initialization is provided for both of the modes, namely private mode and public mode. In particular, that simplifies both making the equipment and also programming it to operate in the different modes.

Thus, in public-use mode 12, a function F1 for cyclically transmitting a location message 13 is shown diagrammatically. For example, during a cycle 14 which, in the context of GSM use, lasts about two seconds, and during a time window situated at the beginning of the cycle, each mobile telephone set sends a location message 13. By being received in the base stations 3 and 4, this message 13 makes it possible to track movement of the user equipped with the mobile telephone set 7. Other functions 15 are implemented in public mode: in particular, the function of transmitting and receiving speech so that the mobile telephone set can be used for conversation. These other functions are diagrammatically represented by a link to a circuit. In practice, they are constituted by functions proposed by the microprocessor of the telephone set 7. For private use, similar functions are accessible. Thus, a location function F2 is the counterpart of the function F1. This duality is particularly simple to implement. It is necessary merely to modify the parameters of the functions while retaining functions that are the same. Thus, more simply, the transmission function is the same in both modes, with only the frequency parameter (900 MHz or 27 MHz) being changed.

In a variant, public/private switch-over is automatic. Thus, when a private base station receives a location signal transmitted by a mobile telephone set which is assigned to it (i.e. for which the private base station already knows the recognition signals which were imposed originally), it puts various constraints on the mobile telephone set. Essentially, it constrains it to use parameters for putting the mobile telephone set in communication with the private base station. Conversely, when a user goes away from home, the mobile telephone set no longer receives responses from its private base station, but it does receive, increasingly well, responses from one or more public base stations. It then enters into communication with such a public base station the first time the reception level of the location signals is greater than a preceding level. In both cases, public/private switch-over is automatic.

In known manner, the private base station includes a stand 16 enabling the mobile telephone set 7 to be held physically in the base station. The stand 16 may be of various shapes, and it is essentially provided either with a cavity for receiving the foot 17 of the mobile telephone set 7, or with a hook designed to engage in a cavity in the mobile telephone set (or vice versa). The cavity or the hook is generally associated with a set of electrical contacts 181. The electrical contacts 181 make it possible in known manner to enter into connection with contacts 182 on the mobile telephone set 7, in particular for recharging the battery of the mobile telephone set when the mobile telephone set is engaged in the stand 16.

According to an essential characteristic of the invention, the private base station 1 is provided with a detector for detecting that the mobile telephone 7 is held therein. For example, at the bottom of the cavity, a mechanical switch 19 is disposed, in particular a switch provided with a lever enabling a signal to be delivered that represents the mobile telephone 7 being put in place in the stand 16.

In a variant, and to simplify manufacture, it may be preferred to use a measuring circuit 20 to measure the charging electric current for charging the battery of the mobile telephone set, when the charging electric current is delivered by the private base station 1. Optionally, the foot 17 of the mobile telephone set 7 is provided with other signalling connectors which enter into communication with corresponding pins on the stand 16. Signals available on the signalling connectors are then used to inform the private base station 1 that the mobile telephone set 7 is "on-hook" (placed on the stand 16). On the basis of the detection signal, the private base station 1 produces a command 22 in a control circuit 21, which command 22 serves to modify the operating mode of the mobile telephone. Operating mode is modified as a function of the detection signal.

According to another essential characteristic of the invention, the mobile telephone then includes a slave circuit 23 for receiving the command 22 and for modifying its operating mode as a function of the nature of the command. In a particular example of use, the circuit 23 operates as a switch to cause the cyclic or continuous transmission of the location message 13 to cease. Naturally, the circuits 21 and 23 are merely specific features of the microprocessors which manage respectively the private base station 1 and the mobile telephone set 7.

In the invention, advantage is taken of the fact that, when the mobile telephone set is situated on the stand 16, then it no longer needs to be located: its location is known. Therefore, it is no longer necessary to transmit location signals, and they are therefore no longer transmitted. Thus, unnecessary transmission in frequency space is avoided. Unnecessary electricity consumption is avoided. The mobile telephone set 7 is subjected to less wear: its life span is therefore lengthened.

In a variant, provision may be made for the command 22 to act directly or in addition on the public/private switch-over mode organized by the switch-over switch 9. In which case, the switch-over switch 9 may be actuated in two manners. In a first manner, corresponding to the conventional mode, it may be actuated automatically or manually, with the user keying in the key sequence on the keys 10 so as to cause the switch-over to take place. In the improvement of the invention, it is necessary merely to place the mobile telephone set on the stand 16 for the switch-over 9 to take place immediately, naturally, and at the same time as the switch 23 opens to cause unnecessary location transmission to cease.

As soon as the mobile telephone set is lifted off its stand, an opposite command 22 is caused to be transmitted, serving to cause the location transmission to be resumed. While the command 22 that causes the transmission to cease can be conveyed via the tabs 18, optionally by carrier current, or by radio transmission, the opposite command 22 transmitted when the mobile set 7 is lifted off the stand 16 is preferably transmitted in radio form by an antenna 24 of the private base station in radio communication with the antenna 25 of the mobile telephone set 7. Preferably, the opposite command 22 is thus the first command transmitted by the private base station 1 when the mobile telephone set is lifted. It supplements the identification and/or location message interchanged between the private base station and the mobile telephone set 7.

In private-use operating mode, the fact that the mobile telephone set 7 cyclically transmits the location message serves essentially to enable the private base station 1 to modulate the power of its transmission as a function of the distance between itself and the mobile telephone set 7. The further the mobile telephone set moves from the private base station, the less strongly its location signals are received in the private base station 1.

If necessary, the detectors 19 and 20, and the control circuit 21 may be situated in the mobile telephone set 7, insofar as the mobile telephone set may itself have means for detecting that it is placed on the stand 16. Therefore, it should be understood that it is the system that has the means for detecting that the mobile telephone set 7 is on-hook even if, in a preferred embodiment, only the private base station is provided with such means.

What is claimed is:

1. A dual-mode telephone system comprising:
    a private base station,
    base stations of a public network, and
    a mobile telephone, the mobile telephone being provided with a switch-over switch that transitions from an operating mode in which the private base station is used to an operating mode in which a public base station is used and vice versa, and including a circuit that transmits a location signal to a base station, the private base station being provided with a physical holder and with an electrical connection respectively that physically hold and electrically couple the mobile telephone,
    said system including a detector that detects that the mobile telephone is held on the private base station, and a control circuit that transmits a command to cease transmission of said location signal by an antenna in said private base station to the mobile telephone, the mobile telephone including a slave circuit that modifies its operating mode as a function of said command.

2. A system according to claim 1, wherein the location signal is cyclic or continuous.

3. A system according to claim 1, wherein the detector is an electronic detector and includes a circuit that measures a charging current by which the private base station charges the mobile telephone.

4. A system according to claim 1, wherein the private base station includes the detector that detects that the mobile telephone is held on the private base station, and the control circuit.

5. A system according to claim 1, wherein the mobile telephone set includes the detector that detects that the mobile telephone is held on the private base station, the control circuit, and the slave circuit.

6. A system for switching between a public network and a private network, comprising:
    a detector that generates an output signal in accordance with a coupling of a mobile device to a stationary device; and
    a control circuit, coupled to said detector, that generates a first command signal and a second command signal by an antenna in said stationary device to the mobile device in accordance with said output signal, wherein said first command signal stops transmission of a location signal from said private network to said public network, and said second command signal resumes transmission of said location signal from said private network to said public network.

7. The system of claim 6, further comprising an antenna that is coupled to said stationary device and generates said second command signal.

8. The system of claim 6, wherein said control circuit is positioned in said stationary device.

9. The system of claim 6, further comprising a slave circuit that is coupled to said control circuit and ceases said transmission of said location signal.

10. The system of claim 6, wherein said detector is positioned in said mobile device.

11. The system of claim 6, further comprising a charge measuring circuit coupled to said control circuit, wherein said detector is positioned in said stationary device circuit.

12. A system for switching between a public network and a private network, comprising:
    a first control signal generated by a control circuit positioned in a base station of said private network in accordance with a phone being engaged with said base station; and
    a second control signal generated by an antenna in said base station to a mobile device in accordance with said phone being removed from said base station, wherein said first control signal stops transmission of a location signal and said second control signal resumes transmission of said location signal from said private network to said public network.

* * * * *